H. B. DEWSTOW.
CANOPY FOR VEHICLES.
APPLICATION FILED JULY 16, 1914.
1,199,766.
Patented Oct. 3, 1916.
2 SHEETS—SHEET 1.
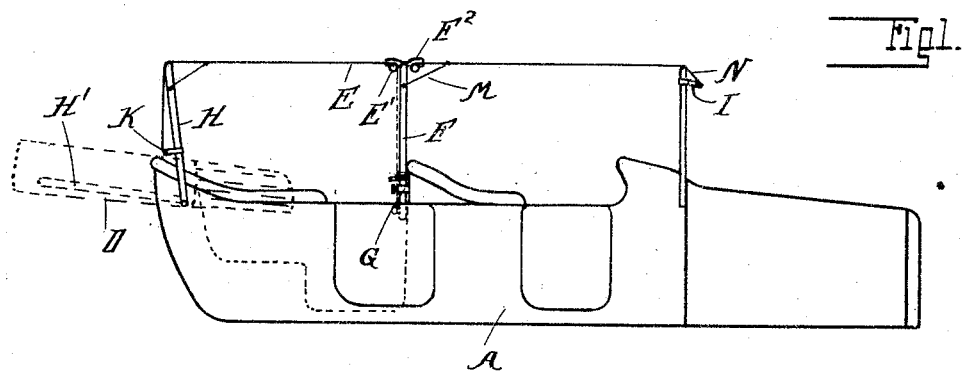
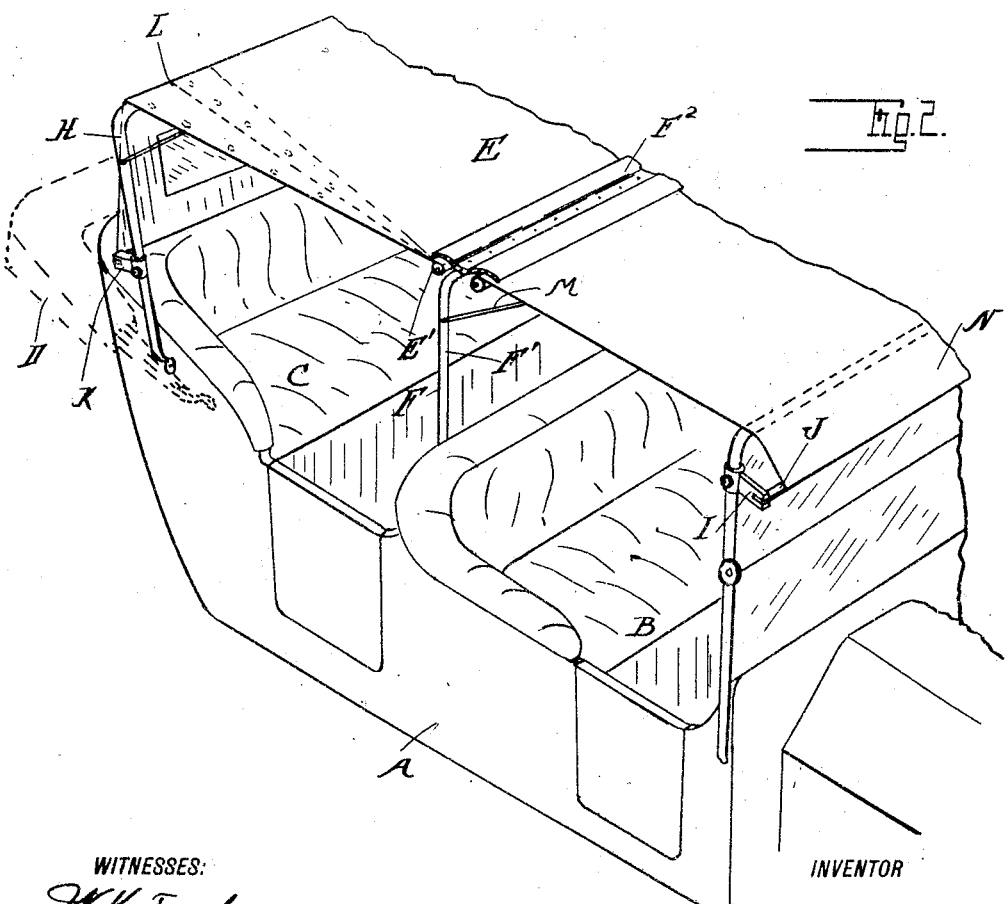
WITNESSES:
INVENTOR
Harold Benj Dewstow
BY
Whittemore Hulbert & Whittemore
ATTORNEYS H. B. DEWSTOW.
CANOPY FOR VEHICLES.
APPLICATION FILED JULY 16, 1914.
1,199,766.
Patented Oct. 3, 1916.
2 SHEETS—SHEET 2.
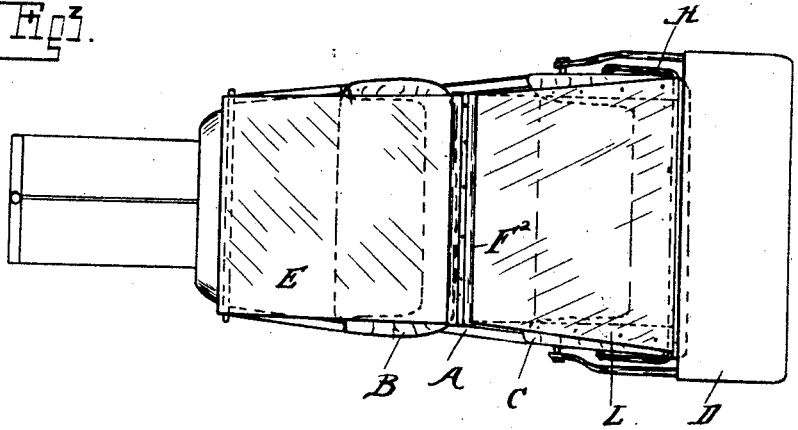
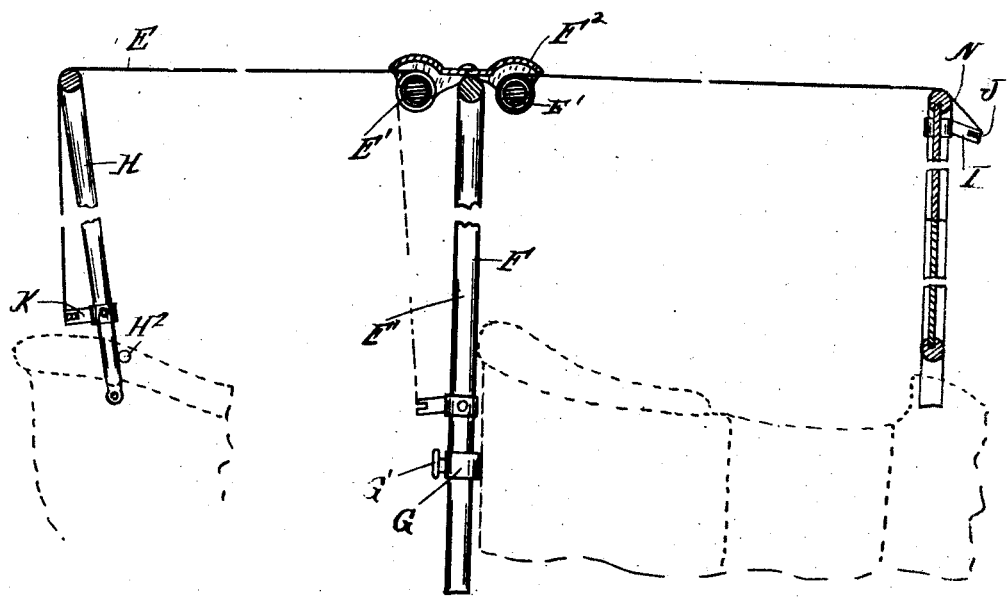

UNITED STATES PATENT OFFICE.

HAROLD BENJ. DEWSTOW, OF DETROIT, MICHIGAN.

CANOPY FOR VEHICLES.

1,199,766.  Specification of Letters Patent.  Patented Oct. 3, 1916.

Application filed July 16, 1914. Serial No. 851,323.

*To all whom it may concern:*

Be it known that I, HAROLD BENJ. DEWSTOW, a citizen of the United States of America, residing at Detroit, in the county of Wayne and State of Michigan, have invented certain new and useful Improvements in Canopies for Vehicles, of which the following is a specification, reference being had therein to the accompanying drawings.

The invention relates to canopies for vehicles and it is the particular object of the invention to obtain a construction which may be quickly extended when required and when not in use may be compactly stored.

More especially it is an object to obtain an auxiliary device which does not interfere with the regular canopy top with which most vehicles are provided, but which may be quickly adjusted and will answer every purpose as a sunshade or protection in a light shower.

In the present state of the art, the type of canopy top most generally used in connection with motor vehicles is one provided with shiftable bows; that is, when the canopy is raised it is necessary to shift at least one of the bows to a different supporting bracket. It is further necessary to disengage the folded canopy from its case, to set the forward end by guy straps, and in fact to perform numerous operations at a sacrifice of time and convenience. With my improved construction the canopy may be spread or collapsed without leaving the car. At the same time it does not interfere with the use of the regular canopy where more complete protection is required.

In the drawings: Figure 1 is a side elevation of a car showing the canopy in extended position; Fig. 2 is a perspective view thereof; Fig. 3 is a plan view; and Fig. 4 is a section.

A is a motor vehicle body which as shown is provided with a forward seat B and rear seat C. This body may be provided with the usual canopy which in collapsed position is located adjacent to the rear seat, as indicated in dotted lines at D.

My improved canopy comprises roller shades or curtains E which are mounted upon a frame F located preferably just in rear of the forward seat and vertically adjustable. This frame preferably comprises uprights F' which are slidably secured in bearings G at the rear of the forward seat, a thumb screw or equivalent clamping device G' serving to hold said upright in raised or lowered position.

$F^2$ is a shield or housing extending between the uprights F' and forming a protection for the shade rolls E' journaled therebeneath.

H is a second frame preferably in the form of a bow pivotally attached to the rear of the vehicle and adapted to swing within and clear of the bows for the main canopy top. This frame or bow H in raised position extends adjacent to the back of the rear seat and forms a supporting roll over which the curtain or shade may be drawn to form both a top and a back.

I are clips attachable to the windshield and provided with a notched bearing for receiving the rod J at the end of the forward curtain.

K are similar clips attached to the rear frame H and engageable with the rod of the rear curtain.

To limit inward movement of the bow H in its position of use, any common form of stop may be employed, as for example a pin $H^2$ projecting from the vehicle body.

With the construction as thus far described in normal position the curtains or shades E are wound upon their rollers E' and housed beneath the shade $F^2$, which is lowered adjacent to the upper portion of the forward seat B. The frame or bow H is also arranged to extend rearward as indicated in dotted lines at H' Fig. 1. Thus there is nothing to obstruct the vehicle body. When it is desired to extend the canopy the frame F is first raised and secured by the clamping screw G'. The forward shade is then drawn off from its roller over the top of the windshield and the rod J which is attached to the end of the curtain is engaged with the notched bearings I. In the same manner the rear curtain or shade may be drawn from its roll and over the frame H, which is first raised to the position shown in full lines in Fig. 1. The curtain is extended beyond this frame and drawn downward to the top of the seat where it may be attached to the brackets K in a similar manner to the attachment of the forward curtain to the brackets I. This will form a canopy which extends from the windshield over both forward and rear seats and then downward to the top of the rear seat, thus forming a complete sunshade as well as protection from a light rain. To collapse the canopy it is only necessary to disengage these curtains from the brackets I and K, whereupon the tension of the spring in the roller E' will re-roll the curtains beneath the shield F². The frame F may then be lowered and the frame H turned backward, all of which operations may be performed very quickly.

It is usual to construct automobile bodies with a rear seat of greater width than the forward seat. Thus a curtain or shield which is restricted to the width of the forward seat would not form a complete covering for the rear seat. This difficulty I have avoided by providing the rear shade or curtain with foldable flaps L of tapering form, so that in extended position they will increase the width of the curtain at the rear bow H to the full width of the seat. When the curtain is rolled these flaps are first folded in, as indicated in dotted lines Fig. 2, which will permit rolling upon the roller E' and housing beneath the canopy F². If necessary the curtains may be stayed by straps M extended from their edges diagonally downward and attached to the bows F and H by buttons or other securing devices.

Where it is desired to use the canopy for the protection of the forward seat only the rear curtain may be drawn downward from its roller and attached to the back of the forward seat, while the forward curtain forms the canopy proper. In the same manner the rear seat alone may be protected by extending only the rear shade leaving the forward shade wound upon its roll.

The shield F² in addition to its function of protecting the roller curtains in collapsed position forms a bridge for the space between said curtains when in extended position. The curve of the shield which partly surrounds the roll also forms a weatherproofing means for excluding rain from the joint when the curtains are extended. The joint between the windshield and the free end of the forward curtain is weatherproofed by arranging the clips or adjustment arms I slightly below the upper edge of the shield so that a hood or inclined portion N is formed for excluding the weather.

What I claim as my invention is:—

1. A canopy top for vehicles comprising a frame vertically adjustably secured adjacent to a seat back, a pair of roller shades mounted on said frame, means for securing the free end of the forward shade when extended horizontally, and means for securing the rear shade when extended either horizontally or vertically.

2. The combination with a vehicle provided with a canopy top of an auxiliary canopy comprising a vertically adjustable frame, a roller shade mounted on said frame and adapted to be drawn horizontally therefrom, and means for attaching the free end of said shade, said auxiliary canopy in both extended and collapsed position clearing the main canopy in either extended or collapsed position.

3. A canopy top for vehicles, comprising a frame vertically adjustable adjacent to the forward seat back, means secured to the seat back for holding said frame adjusted, a roller shade mounted on said frame at the top thereof, means carried by the lower portion of said frame for securing said shade when the same is downwardly extended, and means carried by the vehicle for securing said shade when horizontally extended from its roller.

4. A canopy top for vehicles, comprising a frame vertically adjustable adjacent to the forward seat back, a roller curtain mounted on said frame and horizontally extensible therefrom, a collapsible frame adjacent to the rear seat, to which the curtain is extensible, and means for detachably securing the free edge of the curtain to the lower portion of the rear frame.

5. The combination with a vehicle provided with a collapsible canopy top, of a frame vertically adjustably secured adjacent to the forward seat back, a roller shade mounted upon said frame and adapted to be extended rearwardly from the same, and a swinging collapsible bow adjacent the rear seat forming a support for the free end of said shade, said bow being supported by and within the main canopy when said canopy and said bow are collapsed.

6. A canopy top for vehicles, comprising a frame vertically adjustable adjacent to the forward seat back, a roller curtain mounted on said frame extensible either horizontally or vertically therefrom, means carried by the lower portion of said frame for engaging the edge of said curtain when the same is extended vertically, a collapsible frame mounted adjacent the rear seat, and means carried by the latter frame for engaging said curtain when the same is extended horizontally.

7. A canopy top for vehicles, comprising spaced frames, one of which is vertically adjustable, a roller shade mounted upon said adjustable frame at the top thereof, and means carried by the lower portion of each of said frames for engaging the free edge of the shade, the shade being extensible either downwardly from its roller, or horizontally to the other frame and downwardly thereupon.

8. A canopy top for vehicles, comprising a frame vertically adjustable adjacent to the forward seat back, a pair of roller shades mounted at the top of said frame respectively at the front and at the rear thereof, a shield surmounting the frame extending forwardly and rearwardly to protect the shades when rolled, the shades being extensible from said frame in substantially the same horizontal plane and means carried by the vehicle for securing the front and rear extremities of said shades when extended.

In testimony whereof I affix my signature in presence of two witnesses.

HAROLD BENJ. DEWSTOW.

Witnesses:
 JAMES P. BARRY,
 HENRIETTA E. BOWMAN.